US007483046B2

(12) United States Patent
Lee et al.

(10) Patent No.: US 7,483,046 B2
(45) Date of Patent: Jan. 27, 2009

(54) COMPLEX IMAGE FORMING APPARATUS

(75) Inventors: Yong-Duk Lee, Gunpo-si (KR); Jong-Sung Jung, Suwon-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 834 days.

(21) Appl. No.: 10/989,255

(22) Filed: Nov. 17, 2004

(65) Prior Publication Data

US 2005/0105131 A1    May 19, 2005

(30) Foreign Application Priority Data

Nov. 17, 2003    (KR) .................. 10-2003-0081102
Aug. 26, 2004    (KR) .................. 10-2004-0067436

(51) Int. Cl.
    *B41J 3/54*    (2006.01)
(52) U.S. Cl. .................. 347/172; 347/129; 347/225
(58) Field of Classification Search .................. 347/2–4, 347/171, 172, 174, 175, 176, 129, 225
    See application file for complete search history.

(56) References Cited

U.S. PATENT DOCUMENTS 6,582,039 B2    6/2003    Johnson et al.

FOREIGN PATENT DOCUMENTS

| JP | 64-056552 | 3/1989 |
| JP | 07-117282 | 5/1995 |
| JP | 07-199373 | 8/1995 |
| JP | 07-214827 | 8/1995 |
| KR | 97-45390 | 7/1997 |

OTHER PUBLICATIONS

Computer-generated translation of JP 07-117282 cited in the IDS filed on Nov. 17, 2004.*
Computer-generated translation of JP 07-199373 cited in the IDS filed on Nov. 17, 2004.*

* cited by examiner

*Primary Examiner*—Huan H Tran
(74) *Attorney, Agent, or Firm*—Roylance, Abrams, Berdo & Goodman, L.L.P.

(57) ABSTRACT

A complex image forming apparatus is provided having an improved structure in which a thermal printing engine forming a color image by heat and a laser printing engine performing single-color printing are integrated. The complex image forming apparatus comprises a supplying unit supplying a printing medium; a transfer path via which the printing medium supplied by the supplying unit is transferred; a thermal printing engine being disposed on the transfer path and performing color printing by heating a thermal imaging printing medium having one or more image forming layers; and a laser printing engine being disposed on the transfer path on which the thermal printing engine is installed and performing printing on the supplied printing medium by electrophotolithography. The complex image forming apparatus further comprises an exiting unit receiving the printing medium exited via the transfer path, wherein the complex image forming apparatus performs multi-color printing on the thermal imaging printing engine using the thermal printing engine and single color printing on different printing media using the laser printing engine.

6 Claims, 5 Drawing Sheets

COMPLEX IMAGE FORMING APPARATUS

PRIORITY

This application claims priority under 35 U.S.C. §119(a) to Korean Patent Application Nos. 2003-81102, filed on Nov. 17, 2003, and 2004-67436, filed on Aug. 26, 2004, in the Korean Intellectual Property Office, the entire contents of which are incorporated herein by reference.

BACKGROUND OF THE INVENTION

1. Field of the Invention

The present invention relates to a complex image forming apparatus to print a multi-color image and a single color image using different printing engines. More particularly, the present invention relates to a complex image forming apparatus having an improved structure that integrates a thermal printing engine for forming a color image by heat and a laser printing engine that performs single-color printing.

2. Description of the Related Art

In general, image forming apparatuses, such as laser printers, ink-jet printers, facsimiles, or digital copiers, among other types of devices, comprise a single printing engine inside the image forming apparatus that prints either a single color or a multi-color image, but not both. Thus, in a single color (mono) laser printer, print quality is high and high-speed printing can be performed. However, multi-color printing cannot be performed.

On the other hand, in an ink-jet printer, multi-color printing can be performed. However, print quality is generally lower and printing speed is reduced. In consideration of these problems, a complex image forming apparatus that integrated different engines has been disclosed in U.S. Pat. No. 6,582,039, which issued on Jun. 24, 2003.

Referring to FIG. 1, a conventional complex image forming apparatus is shown that comprises a complex printer in which a laser printing engine I and a color ink-jet printing engine 2 are integrated into the same apparatus. The complex image forming apparatus transfers a paper 4 to either a first or second path 7 and 8 that form different paths. The different paths begin when first and second picking-up units 5 and 6 pick up the paper 4 from a single paper feeding cassette 3. The first and second picking-up units 5 and 6 are installed in the direction of arrow A to moves up and down in the conventional integrated printing apparatus. When the first picking-up unit 5 descends and feeds the paper 4 to the first path 7, the second picking-up unit 6 is separated from the first picking-up unit 5 so that the paper 4 cannot be fed to the second path 8. Alternatively, when the second picking-up unit 6 descends and feeds the paper 4 to the second path 8, the first picking-up unit 5 is separated from the second picking-up unit 6 so that the paper 4 cannot be fed to the first path 7.

As described above, the conventional complex image forming apparatus having the structure as described above, has a single-color laser printing engine and a multi-color laser printing engine such that a user can perform single-color high-speed printing and multi-color printing selectively. The conventional complex image forming apparatus, however, feeds the paper via different paths (one for single-color high speed printing and the other for multi-color printing), and therefore includes a separate paper feeding path and a picking-up unit. Thus, the structure of the conventional complex image forming apparatus is complex and both multi-color and single-color printing cannot be performed on the same paper.

In addition, when color is printed using an ink-jet printer, it takes a long time to both print and dry the printed paper to obtain high quality prints. If the multi-color printed side is touched before drying is complete, the image is irrevocably damaged. The quality of the image on printed paper is notably lower compared to a regular photograph, and the color of the printed image is subject to change over time.

SUMMARY OF THE INVENTION

The present invention provides a complex image forming apparatus to perform both single-color printing by electrophotolithography and high-quality, high speed multi-color printing, the colors of which are not subject to change over time.

According to an aspect of the present invention, there is provided a complex image forming apparatus comprising a supplying unit supplying a printing medium, a transfer path via which the printing medium supplied by the supplying unit is transferred, a thermal printing engine disposed on the transfer path that performs color printing by heating a thermal imaging printing medium having one or more image forming layers and a laser printing engine disposed on the transfer path on which the thermal printing engine is installed that performs printing on the supplied printing medium by electrophotolithography. The complex image forming apparatus further comprises an exiting unit for receiving the printing medium transferred via the transfer path. The complex image forming apparatus according to an embodiment of the present invention thereby performs multi-color printing using a thermal imaging printing engine and single color printing on different printing media using the laser printing engine.

BRIEF DESCRIPTION OF THE DRAWINGS

The above aspects and advantages of the present invention will become more apparent by describing in detail exemplary embodiments thereof with reference to the attached drawings in which.

DETAILED DESCRIPTION OF THE EXEMPLARY EMBODIMENTS

Figure 1:
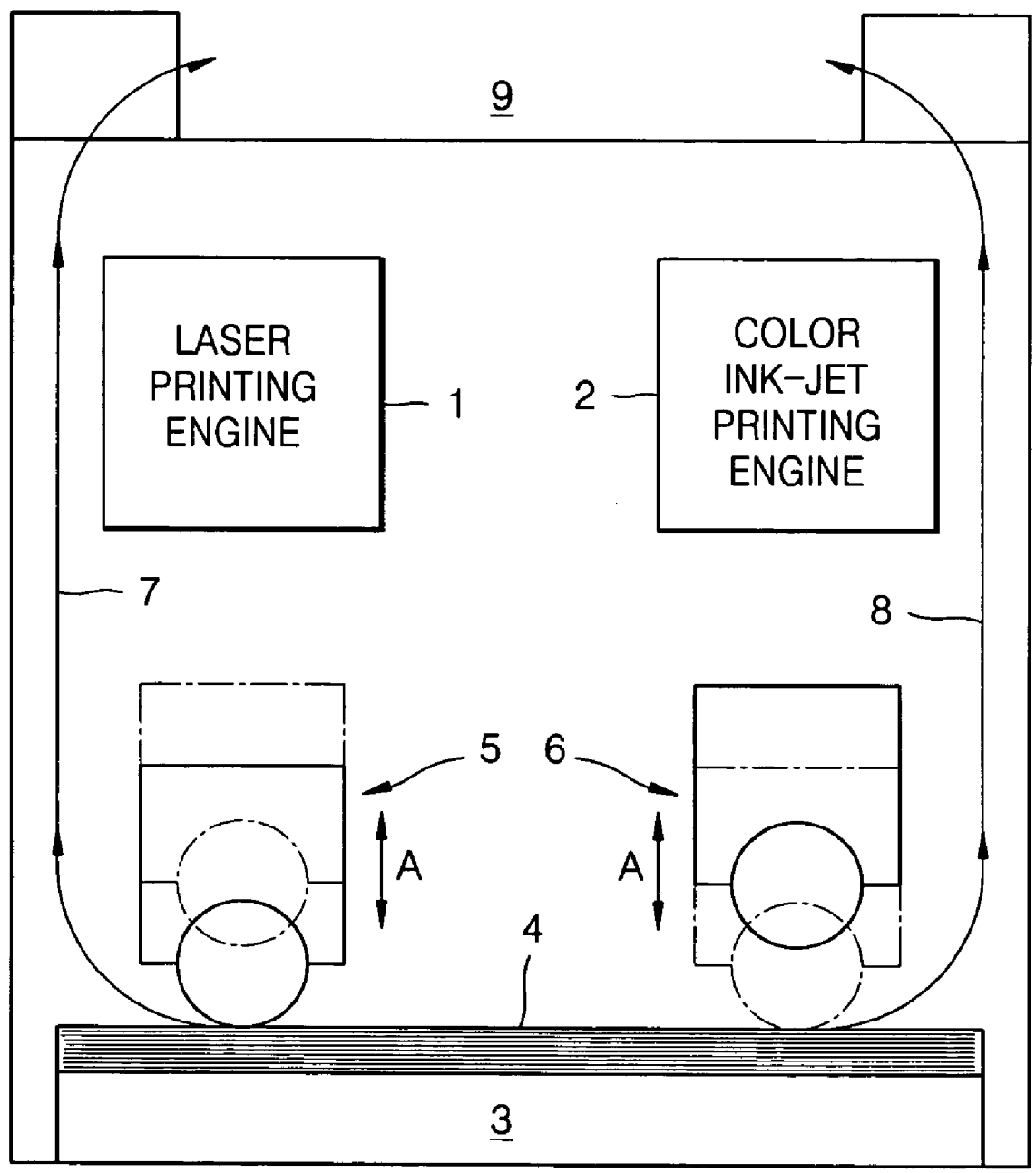
FIG. 1 is a schematic diagram of a conventional complex image forming apparatus.
Figure 2:
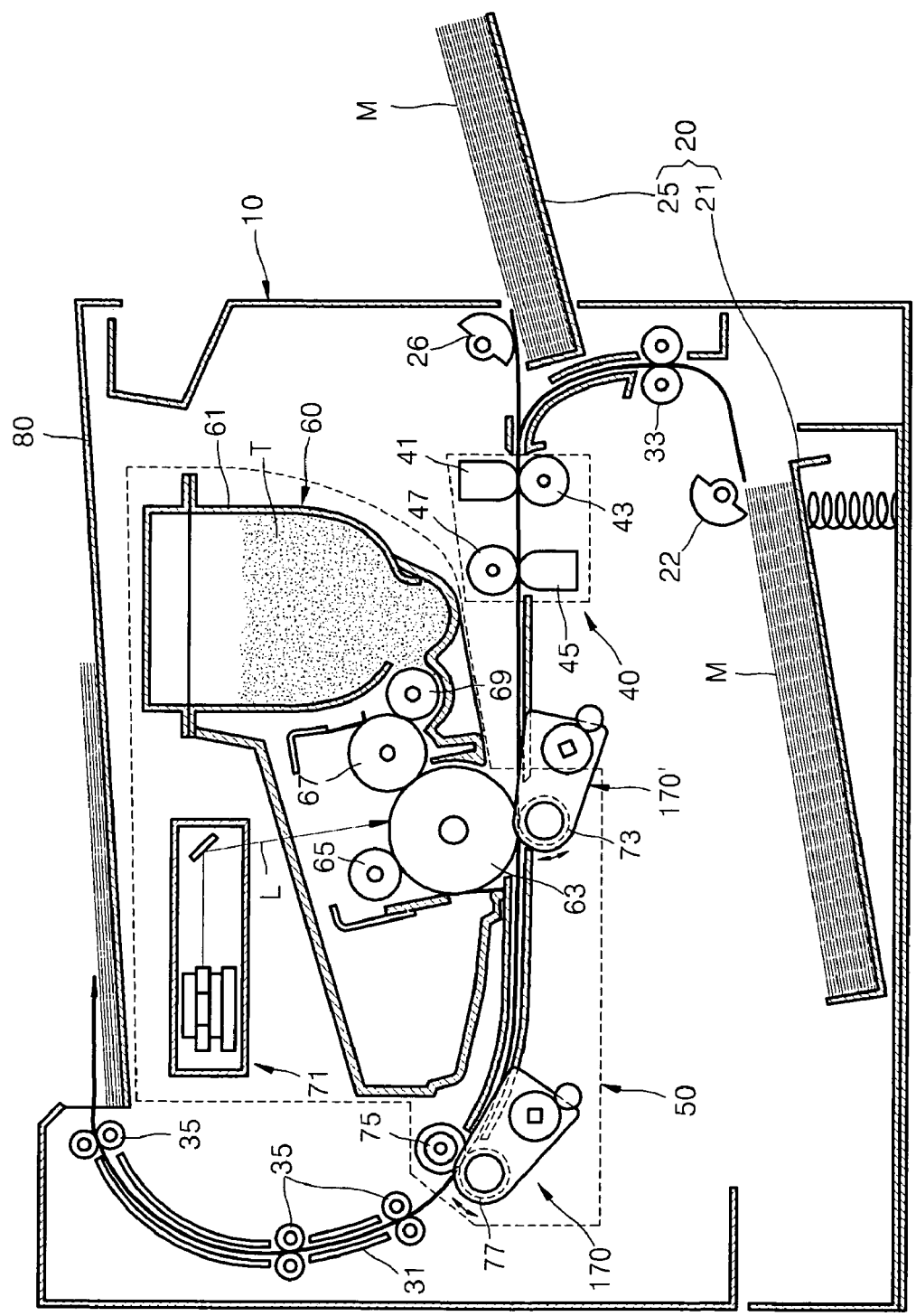
FIG. 2 is a schematic cross-sectional view of a complex image forming apparatus according to an embodiment of the present invention.

Referring to FIG. 2, a complex image forming apparatus according to an embodiment of the present invention comprises a housing 10, a supplying unit 20 that supplies a printing medium M, a transfer path 31 via which the supplied printing medium M is transferred, and a thermal printing engine 40 that forms a color image by heat. The complex image forming apparatus according to an embodiment of the present invention comprises a laser printing engine 50 that forms an image on the printing medium M by electrophotolithography, and an exiting unit 80.

The housing 10 forms the external shape of the complex image forming apparatus. The exiting unit 80 on which the exited printing medium M is stacked is disposed outside the housing 10. In addition, the supplying unit 20, on which the printing medium M to be supplied is stacked, is disposed in the housing 10 to be attached thereto or detached therefrom.

The supplying unit 20 comprises a first supplying portion 21 used in automatically supplying the printing medium M and a second supplying portion 25 used in manually supplying the printing medium M. The first supplying portion 21 is disposed inside the housing 10 and supplies the stacked printing medium M by rotation of a first feeding roller 22. The second supplying portion 25 is disposed outside the housing 10 and supplies the printing medium M via the transfer path 31 by rotation of a second feeding roller 26.

The transfer path 31 is disposed inside the housing 10, transfers the printing medium M supplied by the supplying unit 20, and includes a plurality of transfer rollers 33 and 35. The transfer path 31 is divided into two portions: a first portion that is supplied by the first and second supplying portions 21 and 25, and a second portion that comprises an exiting path that contributes to image formation. The first and second portions are formed as a single body.

Figure 3:
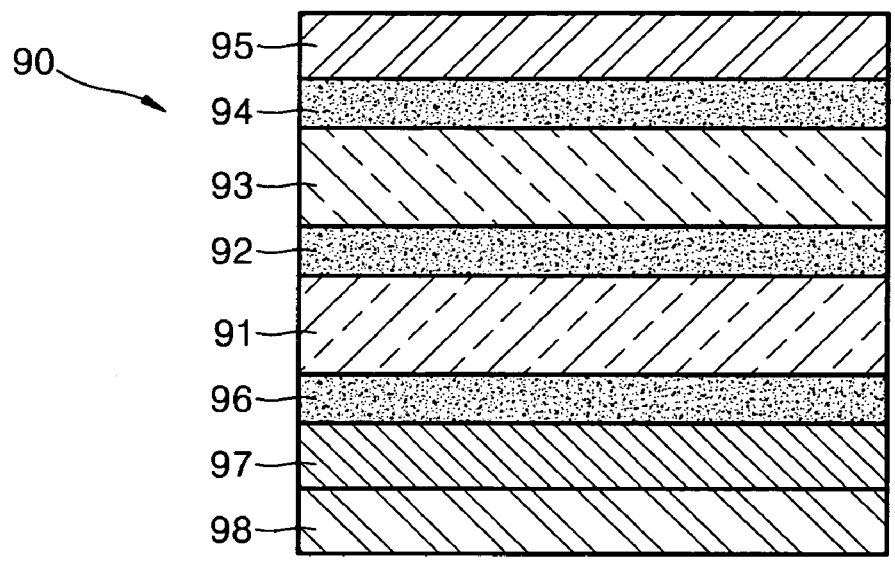
FIG. 3 is a schematic diagram of a thermal imaging printing medium used in the complex image forming apparatus shown in FIG. 2.

The thermal printing engine 40 is disposed on the transfer path 31 and performs color printing by heating a thermal imaging printing medium (90 of FIG. 3). Here, the thermal imaging printing medium 90 is a medium in which the color is selected according to both heating temperature and time. The thermal imaging printing medium 90 is different from regular paper used as a general printing medium and can, in an exemplary embodiment, have the structure as shown in FIG. 3.

Referring to FIG. 3, the thermal imaging printing medium 90 comprises a transparent substrate 91. A first image forming layer 92, a spacer 93, a second image forming layer 94, and an upper protective layer 95 are sequentially formed on the substrate 91. A third image forming layer 96, a reflection layer 97, and a lower protective layer 98 are sequentially formed under the substrate 91.

The first, second and third image forming layers 92, 94, and 96 realize different colors. Each of the first, second and third image forming layers 92, 94, and 96 are comprised of leuco dye of magenta, cyan, and yellow colors and a developing agent. The spacer 93 defines a space between the first image forming layer 92 and the second image forming layer 94, and is formed of a transparent material, so an observer can see colors formed on the first, second and third image forming layers 92, 94 and 96 on the upper protective layer 95.

Figure 4:
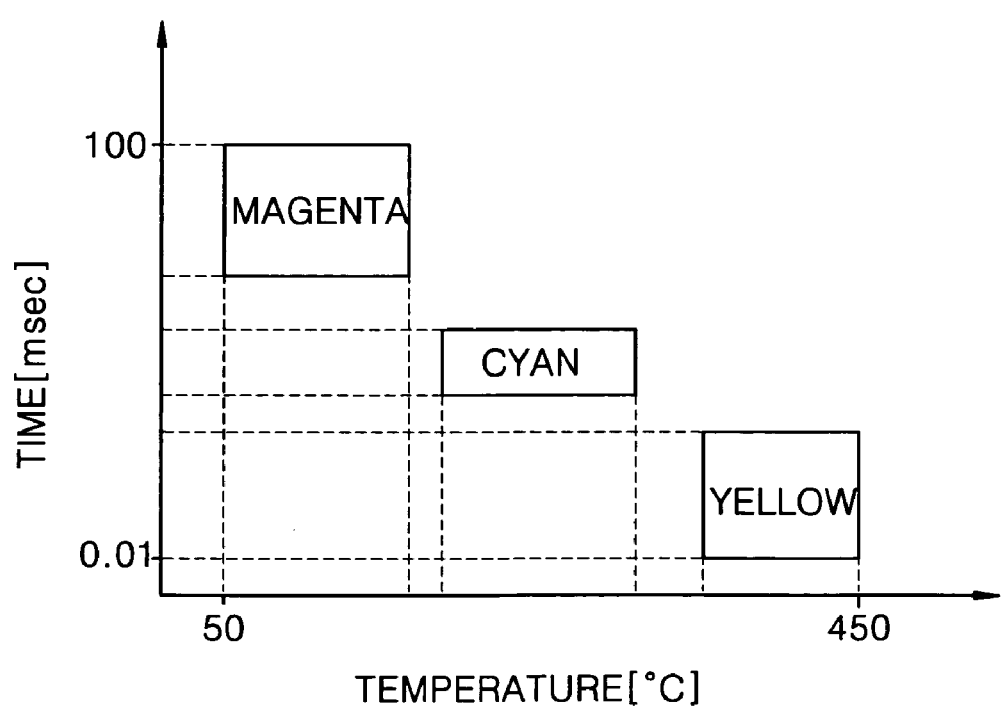
FIG. 4 is a graph of temperature versus time of the thermal imaging printing medium shown in FIG. 3.

Here, the first, second and third image forming layers 92, 94, and 96 respond to different heating temperatures and time, and have the characteristics shown in FIG. 4. Referring to FIG. 4, the temperature at which the first, second and third image forming layers 92, 94, and 96 are heated to contribute to image formation using the thermal printing engine 40 is between about 50° C. to about 450° C., and the heating time is between about 0.01 msec to about 100 msec. As can be seen from FIG. 3, the range of heating temperature and time required to realize each of magenta, cyan, and yellow colors do not overlap with each other. For example, to obtain the color magenta, heat of at least about 50° C. for up to about 100 msec.

The first through third image forming layers 92, 94, and 96 are heated at a heating temperature corresponding to each of the colors using two different thermal heads (41 and 45 of FIG. 2) that will be described in greater detail below, so that a color image can be formed in a desired position. The thermal imaging printing medium 90 is used as a printing medium for the image forming apparatus according to an embodiment of the present invention Since the structure of the thermal imaging printing medium 90 is well-known to those skilled in the art, the thermal imaging printing medium may have a variety of shapes including the structures shown in FIGS. 3 and 4.

The thermal printing engine 40 comprises a thermal head that forms a color image by heating the thermal imaging printing medium 90 having the structure of FIG. 3 at a predetermined temperature and for a predetermined time and a supporting unit disposed to face the thermal head. FIG. 2 shows an example in which the thermal head comprises first and second thermal heads 41 and 45. In this case, the supporting unit also comprises first and second supporting units 43 and 47, each of which is disposed in a position corresponding to each of the first and second thermal heads 41 and 45. Each of the first and second supporting units 43 and 47 supports the thermal imaging printing medium 90 supplied via the transfer path 31.

The first thermal head 41 contributes to image formation on the first and second image forming layers 92 and 94 in the thermal imaging printing medium 90 having the structure of FIG. 3. In accordance with the conditions shown in FIG. 4, each of the first and second image forming layers 92 and 94 are heated at a particular position in which an image is to be formed, for a predetermined time, so that a predetermined color image can be realized.

The second thermal head 45 contributes to image formation on the third image forming layer 96 in the thermal imaging printing medium 90 having the structure of FIG. 3. In accordance with the conditions shown in FIG. 4, the third image forming layer 96 is heated at a particular position in which an image is to be formed, for a predetermined time, so that a predetermined color image can be realized.

A full color image can be realized from the combination of colors obtained by each of the first and second thermal heads 41 and 45. In addition, the image has substantially the same quality as a picture printed on photographic paper. Contrary to an image obtained using an ink-jet printing engine, the image obtained by each head is not damaged even when the surface of the image is touched immediately after printing, and the color of the image does not readily change over time.

The laser printing engine 50 is disposed on the transfer path 31 adjacent to the thermal printing engine 40 and performs electrophotolithography printing on the printing medium M. The laser printing engine 50 comprises a developing unit 60, a light scanning unit (LSU) 71 that forms an electrostatic latent image, a transfer unit 73 that transfers the image formed by the developing unit 60, and a fusing unit that fuses the image transferred onto the printing medium M and has a fusing roller 75 and a pressing roller 77.

The developing unit 60 comprises a toner container 61 in which toner T, of a predetermined color, is stored and an image forming portion to which the toner T is supplied from the toner container 61 and which contributes to image formation. The image forming portion comprises a photosensitive medium 63 that responds to a beam L scanned by the LSU 71, a charger 65 that charges the photosensitive medium 63 to a predetermined potential, a developing roller 67 that is disposed to face the photosensitive medium 63 and develops a toner in an area in which the electrostatic latent image of the photosensitive medium 63 is formed, and a supplying roller 69 which supplies the toner T to the developing roller 67.

The LSU 71 scans light onto the photosensitive medium 63 to form the electrostatic latent image on the photosensitive medium 63. The LSU 71 can be a laser scanning unit or a plurality of light emitting diodes (LEDs) having a linear arrangement. The transfer unit 73 is disposed to face the photosensitive medium 63 in the state where the printing medium M transferred via the transfer path 31 is placed between the transfer unit 73 and the photosensitive medium 63. The transfer unit 73 transfers the image formed on the photosensitive medium 63 onto the supplied printing medium M.

The complex image forming apparatus includes a selection mode so that a laser printing engine does not operate when the thermal printing engine operates and the thermal printing engine does not operate when the laser printing engine operates. Thus, a printing engine can be selected by a user. In addition, when the thermal printing engine is selected by the selection mode, the printing medium M on which the image is formed by the thermal printing engine 40 is supplied via the transfer path 30. Since the printing medium M is sensitive to heat, heat generated from the transfer unit 73 and the fusing unit of the laser printing engine 50 is directly transferred to the printing medium M, and the image formed on the printing medium M can be damaged.

In consideration of this, the laser printing engine 50 further comprises a first contact-adjusting unit 170 that adjusts contact between the fusing roller 75 and the pressing roller 77 and a second contact-adjusting unit 170' that adjusts contact between the transfer unit 73 and the photosensitive medium 63. Each of the first and second contact-adjusting units 170 and 170' comprises a driving source 173 that supplies a pivotal force and a bracket 175. The bracket 175 is installed to pivot on a frame 171, and the pressing roller 77 or the transfer unit 73 is installed at one side of the bracket 175 to rotate. A stud 176 is disposed in a predetermined position of the frame 171 so that the bracket 175 is pivoted on the frame 171, and a pivot central groove formed in the bracket 175 is inserted into the stud 176. In this case, an idle gear 177 is situated between the stud 176 and the pivot central groove. The idle gear 177 is configured to freely rotate on the stud 176, and the rotation position of the bracket 175 is determined in accordance with the rotation position of the idle gear 177.

The driving source 173 is installed in the frame 171 and provides a rotative force to the bracket 175. A driving gear 174 is combined with a rotation central axis of the driving source 173. The driving gear 174 is engaged with the idle roller 177 and rotates and transfers a driving force to the idle roller 177 at a predetermined gear ratio. Thus, when the driving gear 174 is rotated by the driving source 173 in a predetermined direction, the idle gear 177 rotates accordingly. The bracket 175 rotates on the stud 176 so that the pressing roller 77, or the transfer unit 73 installed at one side of the bracket 175, can be move up or down. Because of the aforementioned physical arrangement, the distance between the pressing roller 77 and the fusing roller (75 of FIG. 2) and the distance between the transfer unit 73 and the photosensitive medium (63 of FIG. 2) are established to prevent inadvertent heat damage to the image.

The image formed by the thermal printing engine 40 on the printing medium M is not damaged by heat generated by the thermal printing engine 40 because of the distances formed between the pressing roller 77 and the fusing roller (75 of FIG. 2) and the distance between the transfer unit 73 and the photosensitive medium. In addition, each of the first and second contact-adjusting units 170 and 170' can further comprise a supporting member 178 that supports each of the pressing roller 77 and the transfer unit 73 to rotate, and an elastic bias member 179 that elastically biases the pressing roller 77 and the transfer unit 73 in one direction. The supporting member 178 is installed in an installation groove 171a formed in the frame 171 to make a reciprocating motion and supports the pressing roller 77 or the transfer unit 73 to rotate.

The elastic bias member 179 is placed in the installation groove 171a and elastically biases the supporting member 178 in one direction. For example, the elastic bias member 179 elastically biases each of the pressing roller 77 and the transfer unit 73 in the direction of the fusing roller and the photosensitive medium.

When the supply of power from the driving source 173 is stopped, the fusing roller (75 of FIG. 2) and the pressing roller 77 contact each other, and the transfer unit 73 and the photosensitive medium (63 of FIG. 2) contact each other. Thus, the laser printing engine 50 can selectively operate in a particular mode in which a printing operation can be performed.

Figure 5:
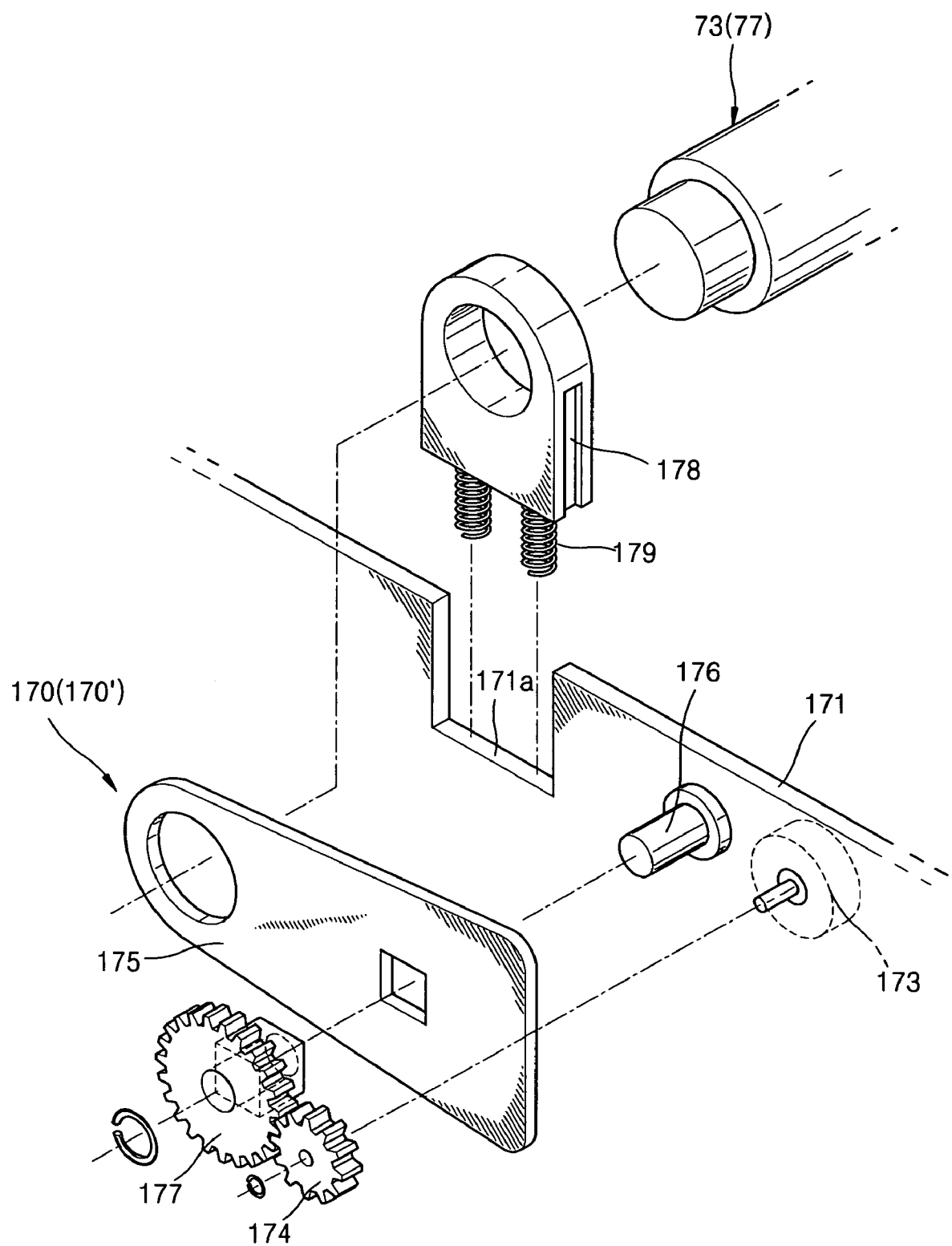
FIG. 5 is an exploded perspective view of first and second contact-adjusting units according to another embodiment of the present invention.
Figure 6:
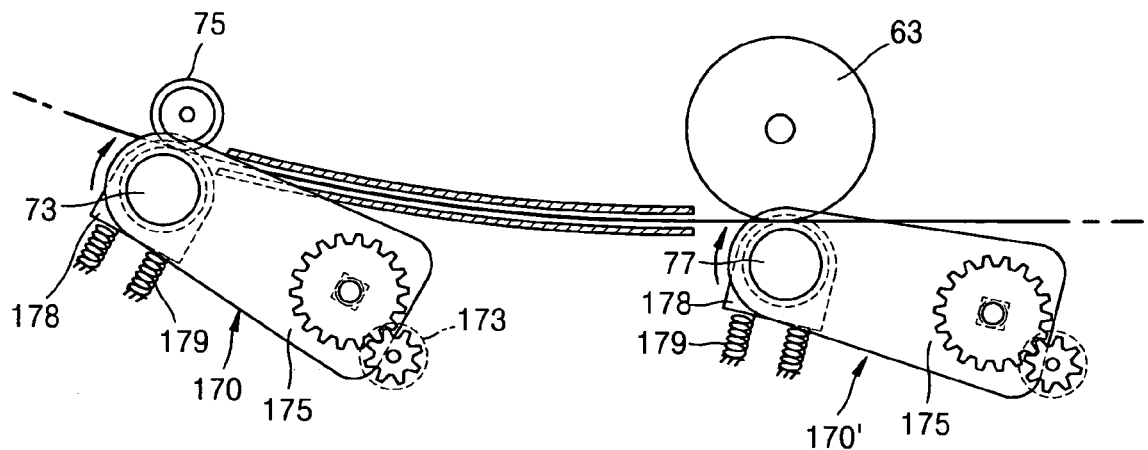
FIGS. 6 and 7 are schematic diagrams illustrating the operation of the first and second contact-adjusting units respectively as shown in FIG. 5.

Operation of the first and second contact-adjusting units 170 and 170' will now be described with reference to FIGS. 6 and 7. FIG. 6 shows a printing mode operated by the laser printing engine 50. Referring to FIGS. 5 and 6, supply of power from the driving source 173 is interrupted, and the bracket 175 is in a free rotatable state. In this case, the supporting member 178 is moved by the elastic bias member 179 in one direction. The pressing roller 77 contacts the fusing roller 75, and the transfer unit 73 contacts the photosensitive medium 63. As a result, when a printing operation is performed by the laser printing engine 50, transfer and fusing is performed normally.

Figure 7:
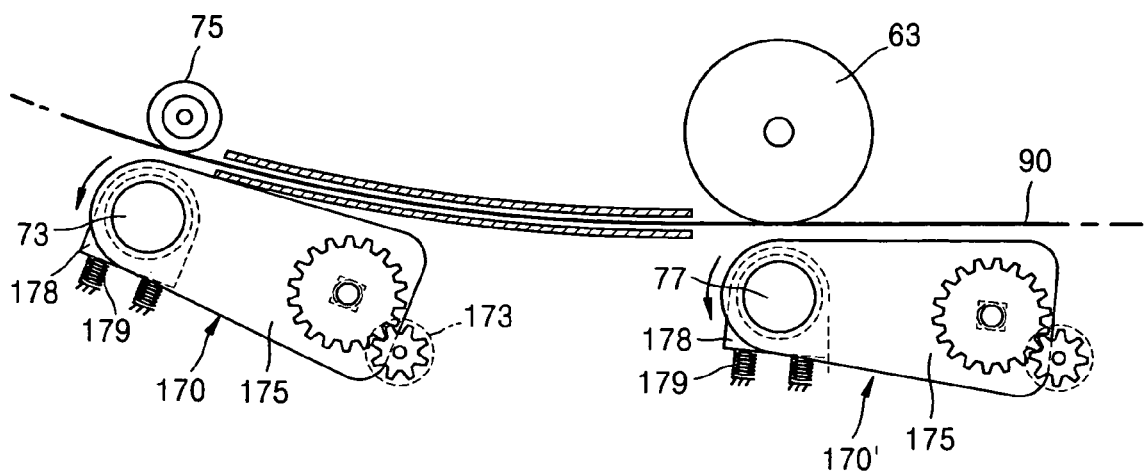

FIG. 7 shows a printing mode operated by the thermal printing engine 40. Referring to FIGS. 5 and 7, when the driving source 173 operates, a rotative driving force is transferred to the bracket 175 via the driving gear 174 and the idle roller 177, and the bracket 175 is pivoted in one direction. As such, the pressing roller 77 and the transfer unit 73 disposed at one side of the bracket 175 withstand the pressure applied by the elastic bias member 179 and contact therebetween is released. In this state, a printing operation is performed by the thermal printing engine 40 so that the printing medium 90 printed by the thermal printing engine 40 is prevented from being damaged by heat when passing between the photosensitive medium 63 and the transfer unit 73 and between the fusing roller 75 and the pressing roller 77.

As described above, in the complex image forming apparatus according to the present invention, a thermal printing engine and a laser printing engine are disposed on a single transfer path inside a housing such that single-color laser printing is performed on a printing paper as a normal printing medium selected by a user at a high speed or thermal color printing is performed on a thermal imaging printing medium. In addition, the printing medium is supplied via a single path and different engines are disposed on the path such that a supplying unit, an exiting unit, and a transfer path are used in common. As a result, multi-color printing and single-color printing are performed and the structure of the complex image forming apparatus is simplified.

In addition, the thermal printing engine is used in the complex image forming apparatus such that color printing of high quality, as with photograph, is performed at high speed. The quality of the image is not damaged even if the printed side is touched immediately after printing. furthermore, the color of the image is not changed even when the image is stored for a long period of time.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A complex image forming apparatus comprising:
   a supplying unit supplying a printing medium;

a transfer path via which the printing medium supplied by the supplying unit is transferred;

a thermal printing engine disposed on the transfer path for performing color printing by heating a thermal imaging printing medium having one or more image forming layers;

a laser printing engine disposed on the transfer path on which the thermal printing engine is installed for performing printing on the supplied printing medium by electrophotolithography; and an exiting unit for receiving the printing medium exited via the transfer path;

wherein the complex image forming apparatus performs multi-color printing on the thermal imaging printing medium using the thermal printing engine and single color printing on different printing media using the laser printing engine;

the laser printing engine comprises:

a developing unit comprising a toner container in which toner of a predetermined color is stored and an image forming portion to which the toner is supplied from the toner container and which contributes to image formation;

a light scanning unit for forming an electrostatic latent image by scanning light on the image forming portion;

a transfer unit disposed to face the image forming portion for transferring the image formed by the image forming portion onto a printing medium;

a fusing unit having a fusing roller and a pressing roller for fusing the image transferred onto the printing medium; and first and second contact-adjusting units respectively adjusting contact between the fusing roller and the pressing roller and contact between the transfer unit and the photosensitive medium.

2. The apparatus of claim 1, wherein the thermal printing engine comprises:

a thermal head for forming a color image by heating the thermal imaging printing medium at a predetermined temperature for a predetermined time; and a supporting unit disposed to face the thermal head for supporting the thermal imaging printing medium.

3. The apparatus of claim 1, wherein the image forming portion comprises:

a photosensitive medium;

a charger charging the photosensitive medium to a predetermined potential;

a developing roller disposed to face the photosensitive medium for developing the toner in an area in which the electrostatic latent image of the photosensitive medium is formed; and a supplying roller for supplying toner to the developing roller.

4. The apparatus of claim 1, wherein each of the first and second contact-adjusting units comprises:

a bracket for pivoting on a frame, wherein one of the pressing roller and the transfer unit are installed at one side of the bracket to rotate; and a driving source installed on the frame for supplying a pivotal force to the bracket;

wherein when the image is formed on the printing medium using the thermal printing engine, a distance between the fusing roller and the pressing roller and a distance between the transfer unit and the photosensitive medium are formed.

5. The apparatus of claim 4, wherein each of the first and second contact-adjusting units further comprises:

a supporting member installed to make a reciprocating motion on the frame and supporting each of the pressing roller and the transfer unit to rotate; and an elastic bias member interposed between the supporting member and the frame for elastically biasing the pressing roller and the transfer unit in one direction, and wherein, when a supply of a power from the driving source is interrupted, the fusing roller and the pressing roller and the transfer unit and the photosensitive medium respectively contact each other.

6. The apparatus of claim 1, wherein the supplying unit comprises:

a first supplying portion for supplying the printing medium stacked by rotation of a feeding roller; and a second supplying portion for supplying the printing medium to the transfer path.

* * * * *